Patented Sept. 23, 1924.

1,509,412

UNITED STATES PATENT OFFICE.

DON W. BISSELL, OF BUFFALO, NEW YORK, ASSIGNOR TO NATIONAL ANILINE & CHEMICAL COMPANY, INC., OF NEW YORK, N. Y., A CORPORATION OF NEW YORK.

PRODUCTION OF META-NITROBENZALDEHYDE.

No Drawing.  Application filed January 24, 1920.  Serial No. 353,922.

*To all whom it may concern:*

Be it known that I, DON W. BISSELL, a citizen of the United States, residing at Buffalo, in the county of Erie, State of New York, have invented certain new and useful Improvements in the Production of Meta-Nitrobenzaldehyde; and I do hereby declare the following to be a full, clear, and exact description of the invention, such as will enable others skilled in the art to which it appertains to make and use the same.

This invention relates to an improved process of making meta-nitro-benzaldehyde by nitrating benzaldehyde with a nitric-sulfuric acid mixture at relatively low temperatures and isolating the product by crystallization.

In the nitration of benzaldehyde, varying amounts of other nitration products are produced besides the meta-nitro-benzaldehyde, depending on the conditions under which the nitration is carried out. Among the other nitration products which may thus be produced in varying amounts under varying conditions, are ortho-nitro-benzaldehyde and nitro-benzoic acid. According to the process of the present invention, the nitration process is so carried out that the nitration products consists mainly of mono-nitro-benzaldehydes containing the meta-nitro-benzaldehyde in large proportion compared with the other nitro products (i. e. ortho-nitro-benzaldehyde, etc.).

The invention will be further illustrated by the following specific example:

7½ liters of mixed nitric and surfuric acids, consisting approximately of 28 to 30 per cent nitric acid, 63 to 66 per cent sulfuric acid, and 4 to 7 per cent water, are placed in a brine jacketed nitration kettle and cooled to 15° C. Then 3 kilograms of benzaldehyde are added at such a rate, with cooling and with constant agitation, that the temperature is maintained at between 5 and 15° C. The best temperature appears to be between 5 and 10° C. since, at such temperatures, it has been found that a large proportion of meta-nitro-benzaldehyde is formed as compared with the other nitro products such as ortho-nitro-benzaldehyde, etc.

After all the benzaldehyde is added, which usually takes about six hours, the mixture is further agitated for a period of about 1 hour, to insure completion of the nitration, during which time the temperature usually falls to zero to 5° C., this fall in temperature being due to the cooling action of the circulating brine in the brine jacket. With the initial charge above referred to, the water content of the spent acid at the completion of the reaction will vary from around 12% to somewhat less than 9%. Using mixed acids containing 28% nitric acid, 65% sulfuric acid, and 7% water, the spent acid will contain about 12% of water; using a mixed acid containing 30% nitric acid, 66% sulfuric acid and 4% water, the spent acid will contain around 9% of water of somewhat less. The product is then poured into ice and water (about 18 kilograms of ice and 42 kilograms of water) thoroughly agitated, allowed to settle, the water drawn off, and the residue washed first with warm water, and then with a warm dilute aqueous solution of soda ash sufficient to neutralize the acid present. In the washing operation it is advantageous to use warm washing liquors, at a temperature of about 40° C., so that the nitration products are kept in the form of an oil, that is, so that they are kept about the solidifying or crystallizing point, inasmuch as they are more difficult to handle and wash in a solidified form. After the washed liquors are drawn off, the oily residue is separated, cooled to about 10° C. with agitation to effect crystallization, and the crystals which separate are filtered off by means of a centrifuge. These crystals are of sufficient purity, without further purification, for the preparation of meta-amino-benzaldehyde. They can of course be further purified to obtain a crystalline product of increased purity.

A somewhat purer and larger yield of meta-nitro-benzaldehyde can be obtained by subjecting the nitration products to a three-stage cooling and crystallization, that is, by cooling the product to three successively lower temperatures, and separating the crystals after each of the cooling operations.

After the separation of the meta-nitrobenzaldehyde in crystalline form, there remains an oily mother liquor consisting chiefly of a mixture of meta- and ortho-nitrobenzaldehydes. This can be further treated for the separation of these products.

In the process of the specific example given above, the mixed nitric and sulfuric acids employed easily nitrates benzaldehyde and gives around 92 to 95 per cent or more of theory of mono-nitro products. No nitrobenzoic acid seems to be formed, nor is there any unchanged benzaldehyde present in the reaction product.

It is advantageous, as above pointed out, to maintain a temperature between 5 and 15° C., and preferably between 5 and 10° C., during the nitration. If the temperature is too low, the rate of nitration is too slow; while if the temperature is too high, the reaction becomes too violent and side reactions also take place at the expense of the product desired. Accordingly, the cooling by means of the brine jacket is continued during the addition of the benzaldehyde, and the benzaldehyde is added at such a rate that the desired low temperature will be maintained during the reaction. With increased cooling effect, it will be obvious that the rate of addition of the benzaldehyde can be somewhat increased, provided thorough agitation is maintained and local overheating thereby avoided.

I claim:

1. The method of nitrating benzaldehyde, which comprises gradually adding benzaldehyde to about 2½ times its volume of a cold mixture of nitric and sulfuric acids containing about 28 to 30% nitric acid, about 63 to 66% sulfuric acid and about 4 to 7% water, cooling and agitating the mixture during the addition, regulating the rate of addition and the cooling so that the temperature of the reacting mixture is held between approximately 5 and 10° C., and separating the nitrated benzaldehyde from the reaction mixture.

2. The method of producing m-nitrobenzaldehyde, which comprises subjecting benzaldehyde to nitration at a temperature not materially exceeding about 15° C. with a mixture of nitric and sulfuric acids of such an amount and strength that at the completion of the nitration not more than about 12% of water is present in the spent acid, and separating the nitrated benzaldehyde from the reaction mixture.

3. The method of producing m-nitrobenzaldehyde, which comprises subjecting benzaldehyde to nitration at a temperature not materially exceeding about 15° C. with a mixture of nitric and sulfuric acids of such a quality and strength that at the completion of the nitration not more than about 12% of water is present in the residual acid liquors, separating the nitrated benzaldehyde from the reaction mixture, washing the nitrated benzaldehyde at a temperature sufficient to keep it in the liquid state, subsequently cooling the product to effect crystallization, and separating the resulting crystals.

4. The method of producing m-nitrobenzaldehyde, which comprises subjecting benzaldehyde to nitration at a temperature not materially exceeding about 15° C. with a mixture of nitric and sulfuric acids of such a quality and strength that at the completion of the nitration not more than about 12% of water is present in the spent acid, separating the nitrated benzaldehyde from the reaction mixture, washing the nitrated benzaldehyde with washing liquors at a temperature above that of solidification, whereby the nitration product is maintained in a liquid condition during the washing operation, and subsequently cooling the product to effect crystallization of the nitrobenzaldehyde, the cooling of the nitration product being carried out progressively from a liquid state to progressively lower temperatures to effect progressive separation of crystals therefrom, and the crystals being separated after each such cooling operation.

5. The method of producing m-nitrobenzaldehyde, which comprises gradually adding benzaldehyde to about 2½ times its volume of a cold mixture of nitric and sulfuric acids consisting approximately of 28 to 30% nitric acid, 63 to 66% sulfuric acid and 4 to 7% water, cooling and agitating the mixture during the addition, regulating the rate of addition and the cooling so that the temperature of the reaction mixture is held between approximately 5 and 10° C., separating the nitrated benzaldehyde from the reaction mixture, washing the same with washing liquors at a temperature above that of solidification, progressively cooling the washed nitration product from a liquid state to progressively lower temperatures to effect progressive separation of crystals therefrom, and separating the crystals after such operation.

6. The method of producing m-nitrobenzaldehyde which comprises subjecting benzaldehyde to nitration at a temperature not materially exceeding about 15° C. with a mixture of nitric and sulphuric acids in such amount and strength that at the completion of the nitration the amount of water present in the spent acid will not be greatly in excess of about 9%, and separating the nitrated benzaldehyde from the reaction mixture.

In testimony whereof I affix my signature.

DON W. BISSELL.

Certificate of Correction.

It is hereby certified that in Letters Patent No. 1,509,412, granted September 23, 1924, upon the application of Don W. Bissell, of Buffalo, New York, for an improvement in "The Production of Meta-Nitrobenzaldehyde," an error appears in the printed specification requiring correction as follows: Page 1, line 82, for the word "about" read *above;* and that the said Letters Patent should be read with this correction therein that the same may conform to the record of the case in the Patent Office.

Signed and sealed this 11th day of November, A. D. 1924.

[SEAL.]

KARL FENNING,
*Acting Commissioner of Patents.*